United States Patent [19]

Beharry

[11] Patent Number: 4,516,890
[45] Date of Patent: May 14, 1985

[54] ANNULAR CUTTER

[75] Inventor: Michael Beharry, Flint, Mich.

[73] Assignee: Hougen Manufacturing, Inc., Flint, Mich.

[21] Appl. No.: 531,347

[22] Filed: Sep. 12, 1983

[51] Int. Cl.³ .................. B23B 41/02; B23B 51/00
[52] U.S. Cl. .................... 408/204; 408/206; 408/224
[58] Field of Search ............. 408/67, 199, 204, 206, 408/207, 223, 224, 227, 229, 230, 703, 705

[56] References Cited

U.S. PATENT DOCUMENTS

| Re. 28,416 | 5/1975 | Hougen | 408/223 |
|---|---|---|---|
| 3,244,035 | 4/1966 | Jehle et al. | 408/204 |
| 4,452,554 | 6/1984 | Hougen | 408/206 |

FOREIGN PATENT DOCUMENTS

| 211408 | 12/1982 | Japan | 408/204 |
|---|---|---|---|
| 2106429 | 4/1983 | United Kingdom | 408/199 |

Primary Examiner—Gil Weidenfeld
Assistant Examiner—Daniel W. Howell
Attorney, Agent, or Firm—Barnes, Kisselle, Raisch, Choate, Whittemore & Hulbert

[57] ABSTRACT

An annular hole cutter of the type having an annular wall with teeth spaced around the lower end and flutes around its outer periphery. The web thickness between the flutes is about one-half the wall thickness. Each tooth has two circumferentially staggered cutting edges and oppositely inclined inner and outer back-off faces at the bottom thereof. The web is reduced in thickness at each tooth so that the inner cutting edge has a width of about one-third the wall thickness and the outer cutting edge has a width of about two-thirds the wall thickness. The inner and outer back-off faces are alternately vertically relieved so that each tooth produces either one or two chips, each of which is substantially narrower than the depth of the flutes which provide the escape path for the chips.

5 Claims, 6 Drawing Figures

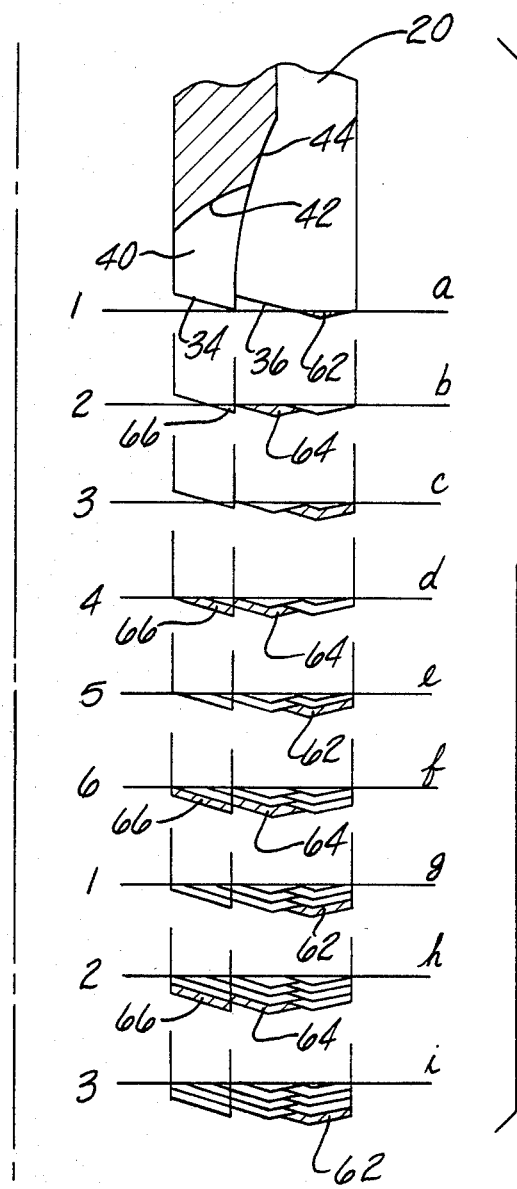

ANNULAR CUTTER

This invention relates to annular cutters.

In many situations the use of an annular cutter for forming holes in metal is preferred over the use of a conventional drill because the substantially greater number of teeth on an annular cutter tends to produce a more efficient cutting operation. However, in order to achieve the higher efficiency, it is essential that the chips generated by the numerous teeth flow freely upwardly through the flutes around the outer periphery of the cutter side wall. One cutter designed to achieve this results is disclosed in U.S. Pat. No. Re. 28,416. In that particular cutter each tooth has two circumferentially staggered cutting edges, each designed to cut a separate chip having a width slightly greater than half the width of the tooth. To accommodate the free discharge of chips the depth of the flutes are preferably slightly greater than half the wall thickness of the cutter.

Another cutter heretofore proposed differs from that disclosed in the aforesaid patent in that each tooth is formed with three circumferentially staggered cutting edges, instead of two, the two inner teeth being formed on the web section of the side wall and the outer cutting edge being located on the flute area of the tooth. In this cutter the flutes may have a depth of slightly less than one-half the thickness of the cutter side wall so that the web section may have a thickness slightly greater than one-half the tooth width. Each tooth has oppositely inclined inner and outer back-off surfaces. The back-off surfaces are alternately vertically relieved on successive teeth in a manner such that each outer cutting edge cuts a chip having a width less than the width of the cutting edge. While the lastmentioned cutter has proven to be more efficient in some respects than that shown in U.S. Pat. No. Re. 28,416, nevertheless it is more costly to manufacture and is less rugged.

The primary object of this invention is to provide a cutter of rugged construction which can be manufactured economically and which is designed to allow the free flow of chips upwardly through the flutes of the cutter.

A more specific object of this invention is to provide an annular cutter wherein each tooth has two circumferentially staggered edges so formed and disposed that each produces either one or two chips each having a width substantially less than the depth of the cutter flutes.

Other objects, features and advantages of the present invention will become apparent from the following description and accompanying drawings, in which:

FIG. 6 is a view showing the chip formation resulting from the progression of the successive teeth of the cutter into a workpiece.

Figure 1:
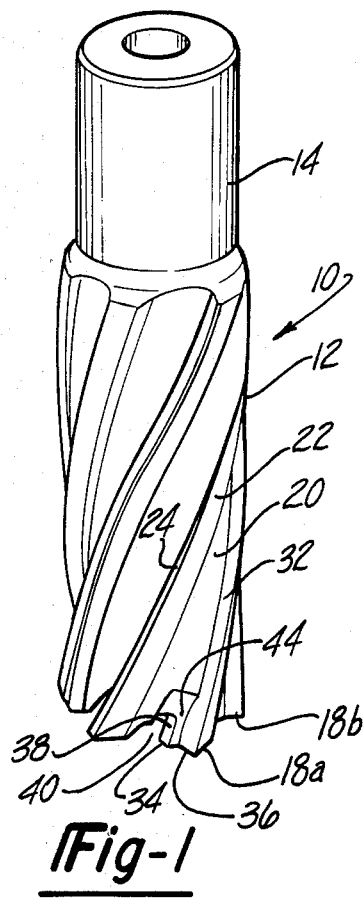
FIG. 1 is perspective view of an annular cutter embodying the present invention.
Figure 2:
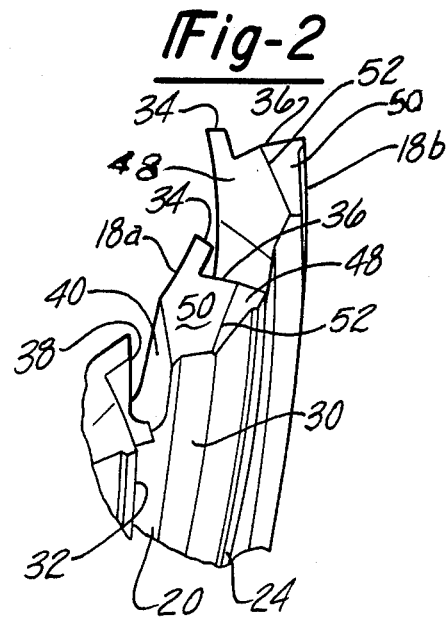
FIG. 2 is a fragmentary perspective view of the cutter on an enlarged scale.

The annular hole cutter of the present invention is designed for forming holes in metal and is generally designated 10 in FIG. 1. The cutter includes a body 12 and a shank 14. Cutter body 12 is of inverted cup shape having a side wall 16, the length of which is greater than the thickness of the workpiece in which the hole is to be cut. The lower end of side wall 16 is formed around its periphery with a plurality of circumferentially spaced cutting teeth. In the embodiment illustrated the alternate teeth are designated 18a and 18b. A spiral flute 20 extends upwardly around the outer periphery of the cutter adjacent each tooth. The successive flutes 20 are separated by a land 22 at the outer periphery of the cutter. The leading edge of each land 22 is formed with a narrow margin 24. The portions of the annular side wall 16 of the cutter between the successive teeth 18 comprise webs 26. The radially outer face 28 of each web 26 defines the radially inner wall of each flute 20. Each flute includes a circumferentially leading side wall 30 and a circumferentially trailing side wall 32.

In the cutter illustrated in the drawings each tooth 18 is formed with two cutting edges 34,36. Cutting edge 36 has two portions, 36a and 36b, as hereinafter explained. Cutting edge 34 is spaced forwardly in the direction of rotation of the cutter from cutting edge 36. The cutting edge 34 is located at the lower end of the trailing face 38 of a gullet 40. The upper end of gullet 40 inclines radially outwardly in an upward direction, as at 42.

At its lower end each web 26 has its outer face relieved radially inwardly, as at 44, so that the radial extent of the inner cutting edge 34 is substantially less than the thickness of web 26. For example, web 26 may have a thickness equal to about one-half the thickness of wall 16 so that flute 20 above the relieved portion 44 of the web also has a thickness of about one-half that of wall 16. The web is relieved at 44 to an extent that the cutting edge 34 has a width equal to about one-third the thickness of wall 16. The relieved portion 44 of web 26 thus forms a circumferentially extending shoulder 46 between cutting edges 34 and 36. If web 26 is relieved so that the inner cutting edge 34 has a width equal to about one-third the wall thickness of the cutter, it then follows that the outer cutting edge 36 has a width equal to about two-thirds the thickness of wall 16.

Figure 3:
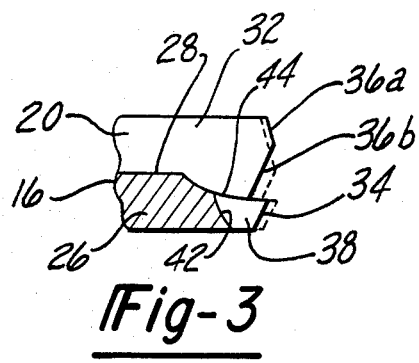
FIG. 3 is a fragmentary elevational view of one tooth of the cutter as viewed from the cutting face thereof, the next successive tooth being shown in broken lines.

The bottom face of each tooth is formed with two back-off or clearance faces 48,50. In the operative condition of the cutter (FIG. 1) the radially inner back-off face 48 inclines axially upwardly and radially inwardly while the radially outer back-off face 50 inclines axially upwardly and radially outwardly. In addition, each of these back-off faces inclines upwardly from its respective cutting edge in a circumferential direction to a slight extent, say 8° to 10°, to provide the necessary clearance for the cutting edges as the tool is rotated and fed axially into a workpiece. The two back-off faces 48,50 intersect in a downwardly projecting crest 52 which in turn intersects the radially outermost cutting edge 36 so as to divide it into a radially outer edge portion 36a and a radially inner edge portion 36b. The radial inclination of the outer back-off face 50 is in the range of about 5° to 35° to the horizontal, and preferably about 10°. The radially inner back-off face 48 inclines radially to the horizontal at an angle of between −3° to +25°, and preferably about 15°. As a result of the inclination of the back-off faces 48,50 in both a radial and a circumferential direction, cutting edges 34,36 are not only staggered circumferentially as shown in FIGS. 4 and 5, but are also staggered vertically when viewed from the front face of a tooth as shown in FIG. 3.

Figure 4:
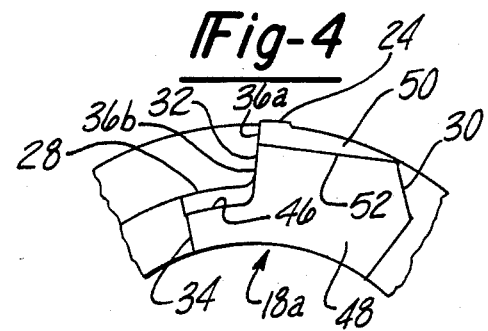
FIG. 4 is a bottom plan view of the tooth shown in solid lines in FIG. 3.
Figure 5:
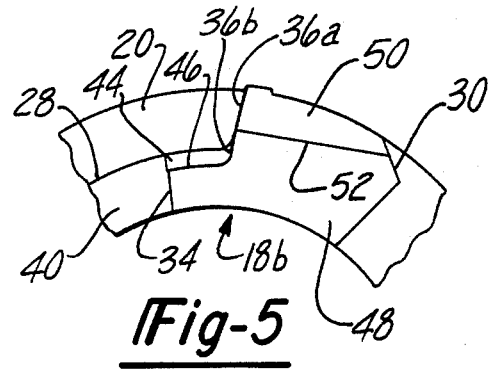
FIG. 5 is a bottom plan view of the tooth shown in broken lines in FIG. 3.

A comparison of FIGS. 4 and 5 reveals that the crest 52 on teeth 18a is located radially outwardly of the crest 52 on teeth 18b. This is one of the primary features of the present invention. The radially staggered crests 52 on teeth 18a,18b result from the fact that on each tooth 18a the back-off face 48 is vertically relieved throughout its radial extent upwardly relative to the back-off face 48 of tooth 18b. This in itself would result in crest 52 on each tooth 18a being disposed radially outwardly relative to the crest 52 on each tooth 18b. In accordance with the present invention the back-off face 50 on each tooth 18b is likewise relieved throughout its radial extent upwardly relative to the back-off face 50 of each tooth 18a. The relieving of the back-off faces 50 on each tooth 18b displaces the crest 52 radially inwardly from the crest 52 on the teeth 18a an additional extent.

The degree to which these back-off faces are relieved vertically is not critical, but, in any event, must be greater than the desired theoretical chip load on each tooth. For example, if a six-tooth cutter is advanced 0.012" per revolution, the theoretical chip load on each tooth (nominal chip thickness) is 0.002". Thus, if the theoretical chip load on each tooth is 0.002", then the back-off faces 48,50 should be vertically relieved as described above an amount greater than 0.002". As a practical matter, assuming that a 0.002" chip load is the minimal chip load at which the tool is to be operated and that a chip load of about 0.005" is the normal maximum chip load at which an annular cutter of this type is operated, then the vertical relief on the back-off faces 48,50 should be in the range of between about 0.003 to 0.012". As a practical matter, it is preferred to relieve these surfaces in an amount of about 0.007 to 0.012", and preferably about 0.010".

It should be appreciated that the extent of radial separation between the crests 52 on the teeth 18a,18b is related to the radial inclination of back-off faces 48,50 and the vertical relief of these faces. These factors must be considered in relation to each other so that crest 52 of tooth 18b still intersect the outer cutting edge 36, not the inner cutting edge 34. In the preferred design crest 52 on tooth 18a should be spaced the same distance from the outer end of edge 36 as the crest 52 on tooth 18b is from shoulder 46. Preferably, crest 52 on tooth 18a is spaced inwardly from the outer end of edge 36 and crest 52 on tooth 18b is spaced outwardly from shoulder 46 about one-third the radial extent of outer edge 36.

The cutting action produced by the tool herein described is best illustrated in the progressive views of FIG. 6. These views depict the cutter as having six teeth, the teeth designated 1, 3 and 5 corresponding to teeth 18a on which the inner back-off face 48 is vertically relieved and the teeth designated 2, 4 and 6 in FIG. 6 corresponding to the teeth 18b on which the radially outer back-off face 50 is relieved. The successive views of FIG. 6, progressing in a downward direction, depict the action of the successive teeth of the cutter for successive rotational increments equal to the pitch between successive teeth. In view a of FIG. 6 tooth #1 is illustrated at the position wherein the cutting edge 36 has just begun to penetrate the top surface of the workpiece and, thus, cut a narrow chip 62 from the top face of the workpiece. At this position the inner portion of the upwardly relieved cutting edge 36 of tooth #1 has not yet engaged the workpiece and the lowest portion of edge 34 is about to engage the workpiece. When the cutter has rotated one tooth pitch and advanced axially from the position shown in view a the inner portion of cutting edge 36 of tooth #2 cuts into the workpiece to produce a chip 64. The outer end portion of cutting edge 34 of tooth #2 has penetrated slightly into the workpiece and cuts a small chip 66.

Upon the next increment of rotation and axial advance of the cutter (view c) the chip 62 produced by cutting edge 36 of tooth #3 will be relatively thick since this cutting edge is not vertically relieved and cutting edge 34 of tooth #3 will not cut a chip since it is relieved. When the tool rotates through another increment (view d) the radially inner portion of edge 36 cuts a wider and deeper groove than previously cut by this edge portion of tooth #2 so that the chip 64 in view d is wider and thicker than the chip 64 in view b.

When all of the teeth have penetrated into the workpiece their full extent (view f) the chips cut by the successive teeth do not thereafter change in size or shape. Thus, the inner portion of cutting edge 36 and cutting edge 34 on teeth 6, 2 and 4 produce the chips 64 and 66, respectively, as shown in views f and h while the outer portion of cutting edge 36 on teeth 1, 3 and 5 produce the chip 62 illustrated in views g and i. The net effect is that teeth 1, 3 and 5 cut a single chip 62 and teeth 2, 4 and 6 cut two chips 64,66, all of these chips being substantially narrower than the depth of the adjacent flute 20. When the teeth are shaped, dimensioned and relieved as described above and shown in FIG. 6, each chip 66 has a width of approximately one-third the thickness of wall 16 and each of the chips 62,64 has a width only slightly greater than chips 66.

It will be appreciated that with the cutter described, even though the web 26 has a thickness of approximately one-half the thickness of the wall 16 of the cutter, the inner cutting edge 34 is relatively rugged and produces a chip of less width than web 26 which escapes quite readily through the flute 20. As compared with an annular cutter wherein two circumferentially staggered cutting edges are formed on the web portion of the cutter side wall, the cutter of the present invention can be manufactured more economically and still produce chips having a width substantially less than the depth of the adjacent flute.

I claim:

1. An annular hole cutter comprising a cutter body having a generally circular cylindrical side wall provided with a plurality of cutting teeth spaced circumferentially around the lower end thereof, a plurality of flutes extending upwardly around the side wall from the lower end thereof, each tooth being connected with the next adjacent tooth by a circumferentially extending web disposed radially adjacent the inner periphery of the side wall and having a thickness of about one-half the thickness of said side wall, said webs being juxtaposed radially with said flutes, each flute having circumferentially spaced leading and trailing side walls and a circumferentially extending inner wall which defines the radially outer face of the web, each tooth having two radially extending cutting edges disposed relative to one another so that each cuts a separate chip when the cutter is rotated and fed into a workpiece, said cutting edges comprising a radially inner cutting edge and a radially outer cutting edge, said radially inner cutting edge being spaced forwardly in the direction of rotation of the cutter from said radially outer cutting edge, the bottom face of each tooth comprising a pair of inner and outer radially oppositely inclined back-off surfaces which intersect in a downwardly extending crest, the lower forward end of said crest intersecting the outer cutting edge, said inner cutting edge extending outwardly from the inner periphery of the cutter for a distance less than the thickness of said web and the radially outer cutting edge extending inwardly from the outer periphery of the cutter and into said web for a distance greater than the depth of said flute, there being a shoulder extending circumferentially between the radially outer end of the inner cutting edge and the radially inner end of the outer cutting edge, the radially outer back-off face of alternate teeth being relieved vertically upward relative to the outer back-off faces of the teeth disposed circumferentially intermediate the alternate teeth and the radially inner back-off faces of said intermediate teeth being relieved vertically upward relative to the inner back-off faces of the alternate teeth.

2. A cutter as called for in claim 1 wherein said inner cutting edge has a radial extent of about one-third the thickness of the cutter side wall and the radially outer cutting edge has a radial extent of about two-thirds the thickness of the cutter side wall.

3. A cutter as called for in claim 2 wherein the extent of vertical relief on said teeth is determined such that the outer cutting edges of the intermediate teeth cut a chip having a radial extent of about one-third the wall thickness of the cutter and the inner and outer cutting edges of the alternate teeth cut separate chips each having a radial extent of about one-third the wall thickness of the cutter.

4. A cutter as called for in claim 1 wherein the outer face of said web is relieved adjacent said cutting edges radially inwardly and in a circumferential direction from the outer end of the inner cutting edge to the inner end of the outer cutting edge.

5. A cutter as called for in claim 4 wherein the radially relieved portion of said web extends vertically upwardly from the radially inner back-off face of the teeth a distance substantially greater than the maximum depth of cut for which the cutter is designed.

* * * * *